United States Patent [19]

Neumeier

[11] Patent Number: 4,737,133
[45] Date of Patent: Apr. 12, 1988

[54] ACCESSORY DEVICE FOR A GAS BALLOON

[76] Inventor: Robert Neumeier, D-8183 Rottach-Egern, Weissachaustr. 21, Fed. Rep. of Germany

[21] Appl. No.: 897,339

[22] PCT Filed: Dec. 9, 1985

[86] PCT No.: PCT/DE85/00512
  § 371 Date: Jun. 24, 1986
  § 102(e) Date: Jun. 24, 1986

[87] PCT Pub. No.: WO86/03421
  PCT Pub. Date: Jun. 19, 1986

[30] Foreign Application Priority Data

Dec. 7, 1984 [DE] Fed. Rep. of Germany ....... 3444674
Aug. 2, 1985 [DE] Fed. Rep. of Germany ....... 8522395

[51] Int. Cl.$^4$ .................. A63H 5/00; A63H 27/10; G09F 25/00
[52] U.S. Cl. .................. 446/397; 446/222
[58] Field of Search .............. 446/222, 220, 485, 397, 446/404, 224; 116/210, DIG. 8, DIG. 9; 40/214; 137/560; 362/96

[56] References Cited

U.S. PATENT DOCUMENTS

| 1,229,794 | 6/1917 | Salzer | 40/214 X |
| 1,820,681 | 8/1931 | Schmalbach | |
| 2,592,444 | 4/1952 | Matelena | 353/74 X |
| 3,721,983 | 3/1973 | Sherer | 343/18 B |
| 4,292,999 | 10/1981 | Szollmann | 446/220 X |
| 4,542,445 | 9/1985 | Marletta | 362/96 |

FOREIGN PATENT DOCUMENTS

| 2854093 | 5/1980 | Fed. Rep. of Germany . |
| 3015962 | 11/1981 | Fed. Rep. of Germany . |
| 233193 | 5/1925 | United Kingdom . |
| 270200 | 5/1927 | United Kingdom . |
| 912716 | 12/1962 | United Kingdom . |
| 2027351 | 2/1980 | United Kingdom . |
| 8401306 | 4/1984 | United Kingdom . |

Primary Examiner—Mickey Yu
Attorney, Agent, or Firm—Price, Gess & Ubell

[57] ABSTRACT

Figure 1:
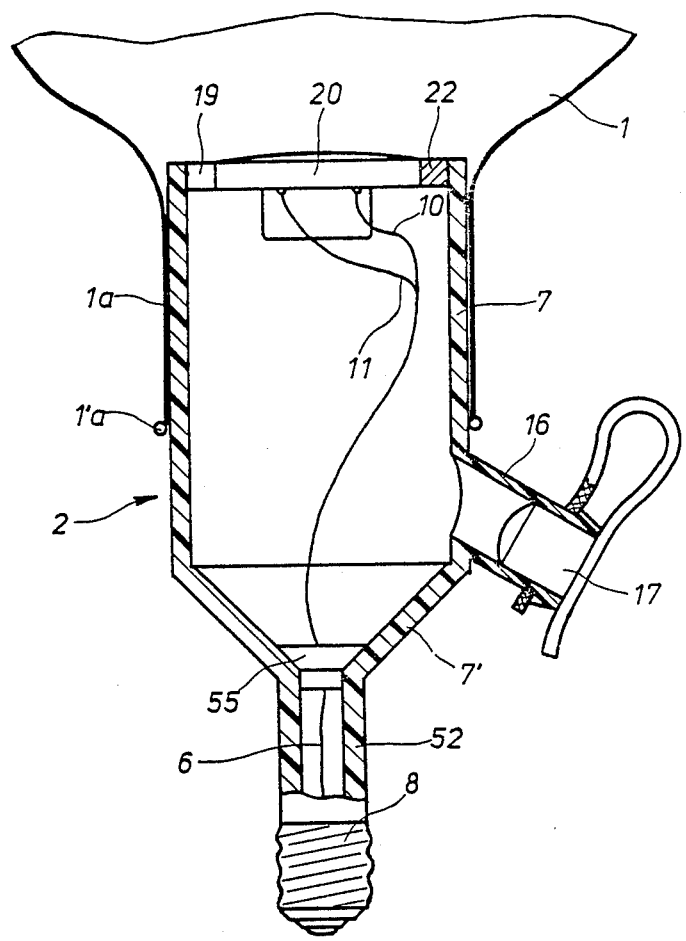

Accessory device for a gas balloon having, bounding its interior, an inflatable balloon envelope (1) on which is constructed a balloon neck (1a) for inflation of the balloon envelope (1). According to the invention, there is on a sealing head (2) adapted to be inserted in sealing-tight fashion into the balloon neck (1a) a sound irradiating device (20) such as a loudspeaker for irradiating sound into the interior of the gas balloon (FIG. 1).

5 Claims, 4 Drawing Sheets

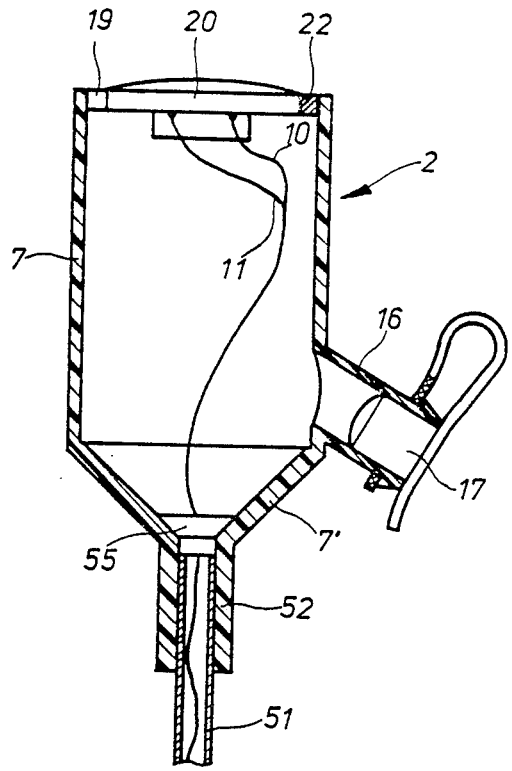
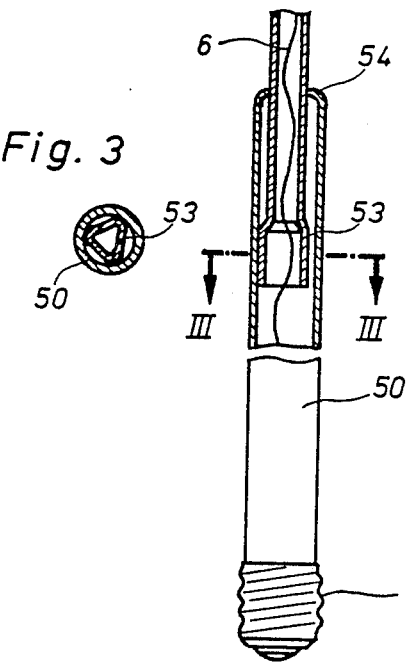
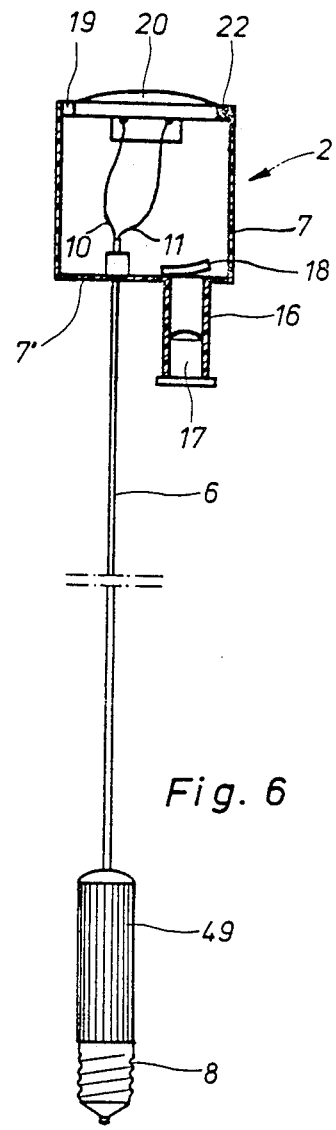
Fig. 2
Fig. 3
Fig. 6

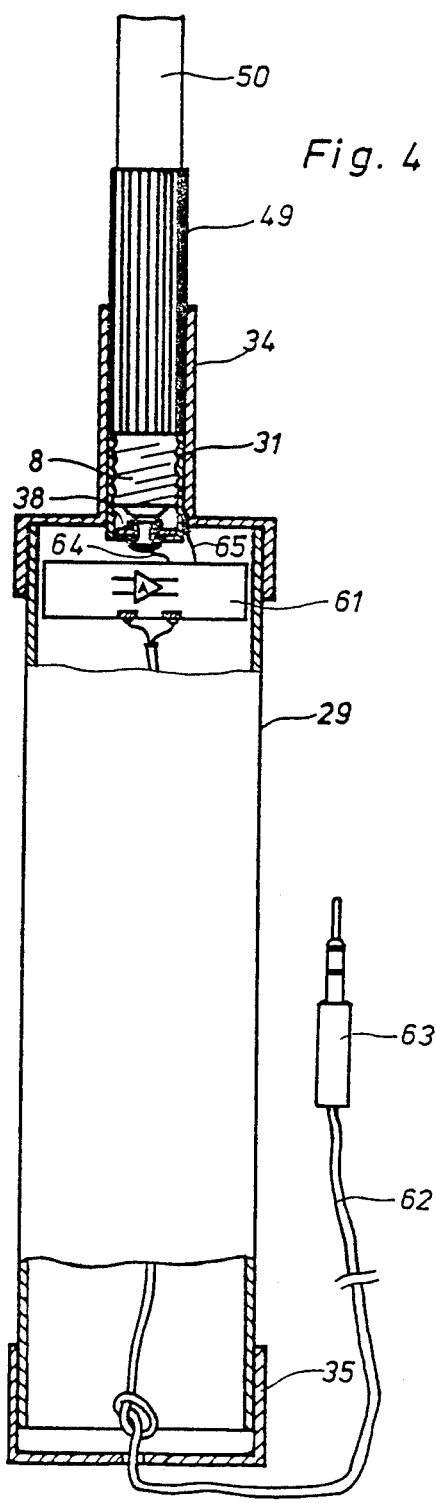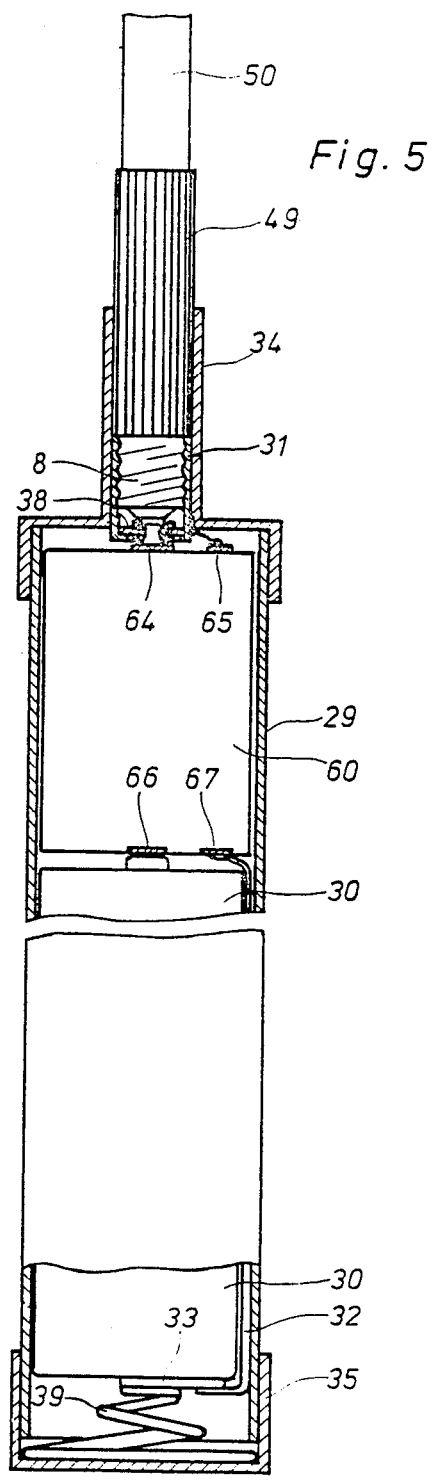
Fig. 4
Fig. 5

ACCESSORY DEVICE FOR A GAS BALLOON

The invention relates to an accessory device for a gas balloon of the type which has an inflatable balloon-envelope defining the interior of the balloon and consisting of elastically expansible material, such as rubber, and on which there is constructed a tube-shaped balloon neck.

Such gas balloons are used widely, for example as children's air balloons, decoration and for advertising purposes. It is also known for the balloon neck to be closed in sealing-tight fashion by means of a sealing head which is introduced into it. Such a sealing head may support an electric lamp for interior illumination of the air balloon. Although this enhances the attractiveness of air balloons, the interior illumination is only perceived in darkness.

The invention resolves the problem of providing an accessory device for inflatable gas balloons by which the attractiveness of such gas balloons is still further enhanced.

The invention provides an accessory device for a gas balloon of the type described in the outset wherein a sealing head is provided for the sealing-tight closure of the balloon neck of the gas balloon, the sealing head being provided with a sound irradiating means which is directed into the interior of the gas balloon after the sealing head has been inserted into the balloon neck and after the balloon-envelope has been inflated.

Such an accessory device makes it possible, for parties, restaurants or garden parties, where air balloon decorations are used, to accomodate in one of the air balloons for example a loudspeaker to serve as a sound irradiating means for directing sound into the interior of the balloon, or alternatively to provide a "talking" balloon or a "musical" balloon for games purposes. With suitable tension in the gas balloon envelope, according to how intensely it is inflated, the balloon-envelope itself can serve as a sound diaphragm improving the tone colour and/or volume of the sound irradiating device.

Although it is possible to accomodate in the sealing head not only the sound irradiating means but also an electroacoustic control device for the latter, such as per se known electronic music computer or music synthesiser, together with the associated power source, in the form of a battery, which can be switched on and off by means of a switch, it is at present preferred to connect the sound irradiating device through electrical conductors to an external electromechanical coupling, e.g. a plug, for electrical connection of the sound irradiating device to an external electro-acoustic control device. Such an electro-acoustic control device may be a per se known microphone system, a radio receiver, a cassette or tape recorder, a music computer or an amplifier system of a musical instrument. Such an electromechanical coupling is preferably so designed and so mechanically connected to the sealing head that in addition to the electrical connection of the sound irradiating device it also constitutes a mechanical coupling for the sealing head to hold the gas balloon. The electro-acoustic control device may be accomodated in a handle part of the accessory device according to the invention. It is however also possible to use an external control device as the electro-acoustic control device. The electromechanical coupling may be a plug-in coupling but is however preferably a rotary coupling such as a bayonet coupling or in particular a screw coupling.

In the particularly preferred embodiment, the electromechanical coupling is a screw-type bulb cap of the size of the screw caps of commercially available incandescent lamps. In consequence, at the same time as the sealing head is fixed mechanically into a holder which has a mating coupling a screw-type lamp socket which is connected to an electro-acoustic control device, switching of the sound irradiating device on and off is achieved by slight rotation of the screw cap in the screw socket, so that a separate switch for this purpose becomes superfluous without the mechanical coupling of the sealing head and thus of the balloon to the mounting thereof being affected. The screw-type bulb cap can be constructed on the sealing head itself, i.e. on its end which protrudes from the balloon neck, or on the free end of a supporting bar or of a supporting rope which forms the electrical conductor connection for operating the sound irradiating means for a suspended gas balloon filled with a light gas.

An advantageous embodiment of the invention resides in providing an electrical amplifier circuit for the sound irradiating means. Such an embodiment can for example be used for operating the sound irradiating means through a prior art portable radio receiver with a headphones socket or for the parallel connection of a plurality of sound irradiating means to a common electro-acoustic control device or tuner.

The peripheral surface of the sealing head is substantially cylindrical, preferably circularly cylindrical; it can however also be somewhat conical. The diameter of the sealing head is greater than that of the balloon neck when the balloon envelope is not inflated and is sufficiently large that the balloon neck is in an elastically widened-out condition when it is positioned on the peripheral surface of the sealing head and is therefore a close fit thereon in order to ensure an elastically gas-tight seating. Preferably, the outside diameter of the sealing head is approximately twice as great as the diameter of the neck of the non-inflated balloon envelope. The sealing head is relatively short. The length of its cup-shaped shell need not be as much as or need only be slightly longer than the elastically widened-out neck of the balloon envelope. Insertion of the sealing head into the balloon neck can take place simply in that first of all the balloon neck is rolled up into a ring which is then pulled onto the associated end of the sealing head, after which the ring is unrolled along the outer surfce of the sealing head.

In the pre-eminently preferred embodiment, the sealing head is constructed as a cup-shaped housing which contains the sound irradiating means and which has an open end and an end which is closed by a bottom, the open end being adapted to be inserted in sealing-tight fashion into the balloon neck while this latter is elastically expanded. Such a design means that the sealing head can be constructed in material-economising fashion and it is possible to utilise the interior of the sealing head to accomodate the sound irradiating means and possibly its control components, existing connecting circuits of the sound irradiating device being easily and in gas-tight fashion led out through the bottom of the cup-shaped housing.

In order to inflate the gas balloon, the neck of which is closed in sealing-tight fashion by the sealing head of the accessory device according to the invention, a separate filler tube can be constructed on the balloon envelope. Preferably, however, the gas balloon is inflated through the sealing head. For this purpose, where the preferred cup-shaped embodiment of sealing head is concerned, there is constructed on the closed end thereof a filler tube which serves as a mouth of a gas supply duct which passes the sound irradiating device and which can be occluded by a plug or a non-return valve or the like.

The invention is described with reference to preferred examples of embodiments which are shown in the accompanying drawings. In the drawings, FIGS. 1 to 3, 6 and 7 show accessory devices according to the invention for inflatable gas balloons having a sound irradiating device, while FIGS. 4 and 5 show two embodiments of a handle housing of an accessory device according to the invention for the embodiments shown in FIGS. 1, 2 and 6.

The sealing heads 2 of the embodiments shown in FIGS. 1 and 2 are to a great extent identical. They have in each case a hollow cylindrical cup-shaped housing 7 injection moulded from a synthetic plastics material and having a conically tapering bottom portion 7' and a short downwardly projecting tube 52. In the open end of the housing 7 which is remote from the short tube 52 there is disposed a sound irradiating device 20 in the form of a commercially available telephone loudspeaker capsule, glued to the periphery of which is an elastic clamping ring 22 by which the sound irradiating device 20 is clamped into the open end of the housing 7. To operate the sound irradiating device 20, there are connected to it electrical conductors 10, 11 which are combined into one cable 6 and which pass into the short tube 52 through a sealing plug 55 or the like which projects into the top end of the short tube 52. The open end of the housing 7 of the sealing head is first of all inserted into the balloon neck 1a of a commercially available air balloon 1 so that the balloon neck 1a and the marginal bead 1'a provided thereon bear in sealing-tight fashion on the outer peripheral surface of the housing 7, and so that the open end of the housing 7 with the sound irradiating device 20 are located at the balloon end of the balloon neck 1a.

At the closed end of the housing 7, at the transition between the shell of the housing and the bottom portion 7' of the housing, there is an integrally moulded filling tube 16 which can be sealed by a plug 17 and which is used for inflating the balloon after it has been pulled onto the housing 7. The clamping ring 22 for the sound irradiating device 20 has at least one air through passage 19 so that the filler tube 16, the interior of the housing 7 and the air passage 19 constitute a gas supply duct which passes through the sound irradiating device 20 and which is used for inflating the balloon 1. In addition to or as an alternative to the closure plug 17, it is possible to provide on the filler tube 16 a non-return valve which checks throughflow towards its free end. The filler tube 16 may be orientated at a right-angle to the axis of the housing 7 but is however preferably, as shown in the drawings, orientated obliquely downwardly in relation to the housing axis. Thus, inflation of the air balloon 1 which has had its neck 1a pulled onto the housing and the distance from which to the filler tube 16 is only small, is favoured.

For connection of the sound irradiating device 20 to an electro-acoustic control unit or tuner, the conductors 10, 11 are connected to an electromechanical coupling in the form of a conventional screw-type bulb cap 8 which, in the case of the embodiment shown in FIG . 1, is fixed on the bottom end of the short tube 52 of the sealing head 2 and in the embodiment shown in FIG. 2 to the bottom end of a supporting rod 50, 51 which is fixed in the short tube 52 of the sealing head 2. By means of the screw-type bulb cap 8, the sealing head 2 can, for simultaneously establishing the electrical connection of the sound irradiating device 20 to an associated electro-acoustic control unit or tuner and mechanical connection of the sealing head 2 to a mounting, be screwed into a screw-type lamp socket connected to the control device or tuner. Such a mounting in the case of the embodiments shown in FIGS. 4 and 5 consists of a handle casing 29 into the upper end of which is flush fitted a conventional screw-type lamp socket 31. It is also possible in the embodiment shown in FIG. 1 to screw the sealing head 2 with the screw-type bulb cap 8 into a conventional screw-type lamp socket which is connected through an electric cable to an electro-acoustic control unit for the sound irrdiating device 20.

The embodiment shown in FIG. 4 has in the handle casing 29 an amplifier circuit 61 to which the screw-type lamp socket 31 is connected and which is connected via an input cable 62 to a coaxial plug 63 for connecting the amplifier circuit 61 and the sound irradiating device 20 to the headphones socket of a portable radio. The amplifier circuit 61 which can also be accomodated in the sealing head itself, need not be provided in the case of an embodiment which is envisaged for connecting the loudspeaker 20 for example to the extension loudspeaker socket of a radio, for which an amplifier is already provided inside the radio. A battery (not shown in FIG. 4) required to operate the amplifier circuit 61 can likewise be accomodated in the handle casing 29 in the same way as the batteries 30 in the embodiment shown in FIG. 5.

In the case of embodiments of the handle casing 29 shown in FIGS. 4 and 5, there projects axially from the top cover of the casing an axial central tubular connector 34 which serves to accomodate the short tube 52 of the sealing head 2 shown in FIG. 1 or the bottom end of the rod 50 shown in FIG. 2, the screw-type lamp socket 31 being glued or clamped into the bottom end thereof. Flanged into the bottom end of the screw-type lamp socket 31 is a contact plate 38 comprising a central contact for transferring current to the central pole of the screw cap 8 which is screwed into the lamp socket 31. This contact plate 38 which is fixed on the socket 31 furthermore co-operates as an abutment with the screw cap 8 so forming with the screw cap 8 an electrically operated switch for switching on and off the sound irradiating device 20 disposed in the sealing head 2: by screwing the screw cap 8 into the screw socket 31 until the central pole of the cap 8 encounters the central contact on the contact plate 38, the electro-acoustic control unit is connected to the sound irradiating device 20 and when the screw cap 8 is unscrewed somewhat in the screw socket 31 until the central pole of the cap 8 moves away from the central contact on the countact plate 38, the power connection is broken without the mechanical connection of the sealing head 2 to the handle casing 29 being substantially broken.

In the case of the embodiment shown in FIG. 4, the output 64 of the amplifier circuit 61 is soldered to the central contact of the contact plate 38 and the other output 65 of the amplifier circuit 61 is clamped between the screw socket 31 and the tubular connector 34 for electrical connection to the screw socket 31. In the case of the embodiment shown in FIG. 5, on the other hand, the electro-acoustic control device for the sound irradiating means 20 is a music computer 60 of per se known construction and this, together with rod-shaped batteries 30 for supplying power, is accomodated in the handle casing 29. One output 64 of the music computer is constructed as a central contact on the contact plate 38 of the screw socket 31, whereas the other output 65 of the music computer 60, as with the embodiment shown in FIG. 4, is connected to the screw socket 31. Constructed at the other end of the music computer 60 is a central power input contact 66 for transferring the current from the central pole of the battery 30 of the music computer 60, whereas a flat cable 32 has its conductor wires soldered to the earthing contact 67 of the music computer 60. Soldered on the bottom end of the flat cable 32, to the exposed conductor cores therein, is a contact plate 33 which is pressed by a coil spring 39 firmly against the bottom of the battery casing of the adjacent battery 30. The coil spring 39 also provides the contact pressure between the batteries 30 and the central power input 66 of the music computer 60 and between the central output 64 thereof and the central contact of the contact plate 38 of the screw socket 31. To change the batteries 30, the bottom cap-shaped cover 35 of the handle casing 29 is separated from this latter together with the coil spring 39 which is supported thereon, after which the batteries 30 can be slipped out of the casing. When this happens, the contact plate 33 is swung laterally downwards and away from the batteries 30, because the flat cable 32 is very flexurally soft. The contact plate 33 then projects downwards out of the handle casing 29, so that the new batteries 30 can easily be inserted into the casing, whereupon the contact plate 33 is swung back again against the bottom of the casing of the bottom battery 30 and is clamped between the coil spring 39 and the battery 30 by fitment of the cover 35 together with the coil spring 39. Connection of the cover 35 to the casing 29 may be a screwed connection. Preferably, however, a bayonet connection is provided (not shown).

In the case of the embodiment shown in FIG 2, the supporting rod 50, 51 for the sealing head 2 is constructed as a telescopic rod. Alternately however, it can be of non-telescopic construction. The supporting rod 50, 51 is preferably capable of being elastically bent so that the air balloon 1 connected to the handle casing 29 can be swung back and forth elastically together with the sealing head 2. In the case of the embodiment where the supporting rod is a telescopic rod according to FIG. 2, this telescopic rod consists of an inner telescopic tube 51 which is inserted into and glued into the short tube 52 of the sealing head 2, and an outer telescopic tube 50, the outside diameter of which is in accordance with that of the tube 52 and on which the screw cap 8 is fixed. The cable 6 which is led in sealing-tight fashion out of the sealing head 2 passes through the telescopic supporting rod 50, 51 in helically wound fashion so that the cable with the telescopic tubes 50, 51 can be extended and retracted. It is however also possible to construct the electrical conductor connection in any other per se known manner so that the cable 6 is capable of following the telescopic extension of the support rod 50, 51. In the case of the embodiment shown in FIG. 2, the free end of the outer telescopic tube 50 has a flanged-in edge 54 which bears in slidingly deplaceable manner on the inner telescopic tube 31 which in turn has at the free end a cross-sectionally triangular taped portion 52 which, corresponding to FIG. 3, has its corners bearing in sliding fashion on the inside face of the outer telescopic tube 30. Such a configuration at the same time achieves satisfactory guidance of the telescopic tubes within one another without any close adaptation of the tube diameters to one another and the flanging-in and cross-sectionally triangular-shaped portion co-operate as abutments and prevent a complete pulling apart of the telescopic tubes. In accordance with the embodiments shown in FIGS. 4 and 5, the screw lamp cap 8 may be extended towards the supporting rod 50 from a ribbed sleeve-shaped handle 49 enclosing the latter and may be fixed thereon. When the screw cap 8 is screwed fully into the screw socket 31, the sleeve-like handle 49 projects upwardly and out of the tubular connector 34. Its outside diameter corresponds substantially to the inside diameter of the tubular connector 34 so that the supporting rod 50 is guided in the tubular connector 34 of the handle housing 29 in such a way that it is braced to prevent lateral wobbling. Furthermore, the handle sleeve 49 facilitates to and fro rotation of the supporting rod 50 in relation to the handle housing 29 for switching the sound irradiating device 20 on and off in the sealing head 2.

The embodiment of an accessory device according to the invention and as shown in FIG. 6 is intended for a freely suspended air balloon filled with a lightweight gas. Here, too, the sealing head 2 comprises a cup-shaped hausing 7 consisting of synthetic plastics material and having a closed bottom member 7' which is however, in contrast to FIGS. 1 and 2, disposed at a right-angle to the housing axis. In accordance with the embodiments shown in FIGS. 1 and 2, a sound irradiating device 20 is clamped into the top open end of the housing 7 by means of a flexible clamping ring 22. The connecting leads 10, 11 connected to the sound irradiating device 20 pass out in gas-tight fashion through the end member 7' of the sealing head 2 in the form of a cable 6 which serves at the same time as a supporting cable for the suspended air balloon (not shown in FIG. 6). At the bottom end of the cable 6, the two leads 10, 11 are likewise electrically connected to the two poles of a bulb screw cap 8 and are mechanically fixed therein. Also according to FIG. 6, the screw cap 8 is extended at the top by a sleeve-like handle 49 which also encloses the cable 6. By means of the sleeve-like handle 49, therefore, the screw cap 8, as explained in connection with FIGS. 4 and 5, can be screwed into the lamp socket 31 of the handle casing 29 for simultaneous mechanical achoring of the suspended air balloon on the casing 29 and establishment of the electrical connection of the sound irradiating means with an associated electro-acoustic control unit or tuner. Switching the sound irradiating device 20 on and off will, as explained above, also take place by minimal rotation of the handle 49.

As FIG. 6 shows, the housing 7 of the sealing head 2 consists of the thinnest gauge material possible and also the cable 6 should be as thin and light as possible. Also the sound irradiating device 20 should be as light as possible in its construction so that when inflated with the light-weight gas the balloon can float in the air and does not sink to the ground under the weight of the sealing head 2, the sound irradiating device 20 and the cable 6. Also for reasons of weight, the housing 7 of the sealing head 2 in FIG. 2 is as short as possible. Therefor, otherwise than in the embodiments shown in FIGS. 1 and 2, the filling tube 16 is not at the bottom end of the cup-shaped shell of the housing 7 but in the end member 7' of the housing. Therefore, the length of the housing 7 need not be greater than the length of the balloon neck which is stretched over the housing 7 when it is in its elastically expanded condition. Furthermore, the filling tube 16 as shown in FIG. 6 comprises a non-return valve which, in the embodiment shown, consists of a valve flap 18 which is fixed on one side on the end member 7' of the housing and by which the top end of the filler tube 16 is sealed under the pressure of the light-weight gas in the balloon. In addition, as shown in FIG. 6, a closure plug 10 may be provided. The gas apertures 19 are, in accordance with FIGS. 1 and 2, constructed as discontinuances in the clamping ring 22.

Figure 7:
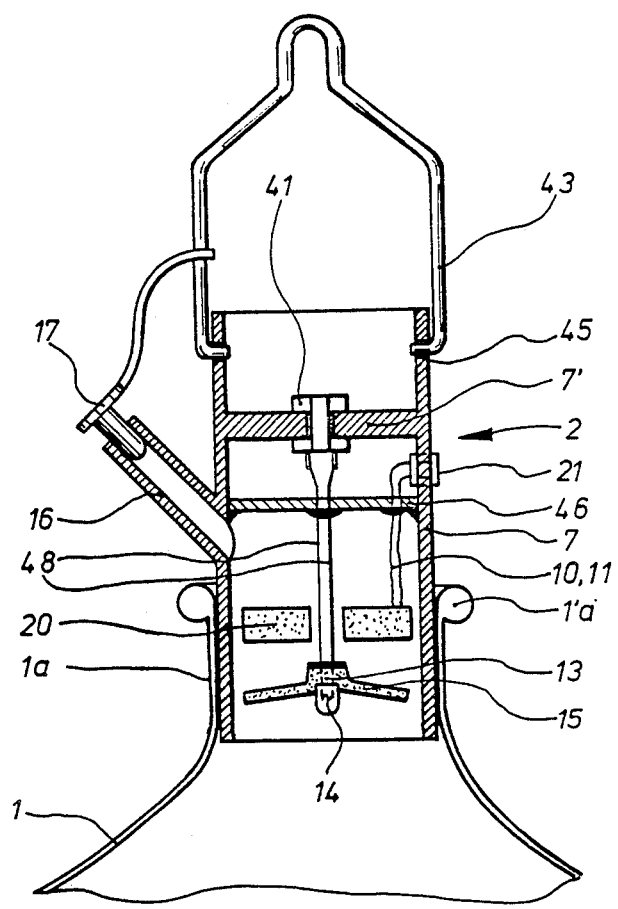

In the case of the embodiment shown in FIG. 7, there is in the interior of the cup-shaped sealing head 2 in addition to the sound irradiating device 20 an electric lamp 14 for internal illumination of the air balloon 1. The electric lamp 14 is disposed at the open end of the housing 7 and is enclosed by a reflector 15 which ensures satisfactory illumination of the interior of the balloon 1 although the lamp 14 is not in the middle of the balloon but at the balloon end of the hollow neck 1a. The electric lamp 14 is seated in a lamp mount 13 on the reflector 15 and its electrical connecting leads 48 are passed in sealing-tight manner through a seal plate 46 inserted into the housing 7 of the sealing head 2 to a plug-in coupling 47 located on the housing bottom member 7' and intended for the plug of a power supply cable (not shown). The electrical connecting leads 10, 11 of the sound irradiating device 20, which may consist of one or more micro-loudspeakers or ceramic oscillators, are likewise passed in sealing-tight fashion through the seal plate 46 and connected to the contacts of an electromechanical coupling 21 in the form of a plug-in coupling on the shell of the cup-shaped housing 7. Mechanical fixing of the reflector 15 with lamp 14 and of the sound irradiating device 20 behind the reflector in the sealing head 2 is not shown in FIG. 7. However, the reflector 15 and the sound irradiating device 20 are as shown diagrammatically in FIG. 7 so constructed and fixed that passages are provided for the passage of gas during inflation of the air balloon and for the passage into the air balloon of sound oscillations which are irradiated by the sound irradiating device 20.

As with the embodiments shown in FIGS. 1 and 2, in the case of the embodiment shown in FIG. 7, there is integrally moulded laterally on the cup-shaped housing an obliquely upwardly projecting filler tube 16 which can be sealed by a sealing plug 17. Furthermore, the cup shell of the housing 7 is extended beyond the end member 7' by a wall in which there are constructed suspension holes 48 for attachment of a bracket 43 of the sealing head 2.

I claim:

1. An accessory device for a gas balloon having a balloon neck comprising:
   a sealing head means for insertion in sealing-tight manner into the balloon neck; and
   a loudspeaker mounted in conjunction with said sealing head means and adapted to be driven by an electro-acoustic control unit for radiating sound into the interior of the gas balloon, wherein the loudspeaker is connected by electrical connecting conductors to an external electromechanical coupling means for electrical connection of the loudspeaker to an electro-acoustic control unit, the electro-mechanical coupling means being mechanically connected to the sealing head means.

2. The accessory device according to claim 1 wherein the electromechanical coupling means comprises a screw lamp cap.

3. The accessory device according to claim 1, wherein the sealing head is constructed as a cup-shaped housing containing the loudspeaker and having an open end and an end closed by a bottom member, said open end being adapted to be inserted in sealing-tight fashion into the balloon neck.

4. The accessory device according to claim 3, wherein the electromechanical coupling is mechanically connected to the bottom member of the cup-shaped housing.

5. The accessory device according to claim 3, further including a sealable gas supply passage formed at the closed end of the housing and means for conducting gas through said loudspeaker for inflating and deflating said balloon.

* * * * *

UNITED STATES PATENT OFFICE
CERTIFICATE OF CORRECTION

Patent No. 4,737,133                    Dated April 12, 1988

Inventor(s) Robert Neumeier

It is certified that error appears in the above-identified patent and that said Letters Patent are hereby corrected as shown below:

Column 1, line 24, delete "in" and insert --at-- therefor.

Column 2, line 8, insert --as-- before "a", first occurrence.

Column 4, line 58, delete "countact" and insert --contact-- therefor.

Signed and Sealed this

Eighth Day of November, 1988

Attest:

DONALD J. QUIGG

Attesting Officer    Commissioner of Patents and Trademarks